United States Patent [19]
Silfvast et al.

[11] 3,900,803
[45] Aug. 19, 1975

[54] LASERS OPTICALLY PUMPED BY LASER-PRODUCED PLASMA

[75] Inventors: William Thomas Silfvast; Obert Reeves Wood II, both of Holmdel Twp., Monmouth County, N.J.

[73] Assignee: Bell Telephone Laboratories, Incorporated, Murray Hill, N.J.

[22] Filed: Apr. 24, 1974

[21] Appl. No.: 463,616

[52] U.S. Cl. .......................... 331/94.5 P; 330/4.3
[51] Int. Cl.² ........................................... H01S 3/09
[58] Field of Search ................. 331/94.5; 330/4.3

[56] References Cited
UNITED STATES PATENTS

| | | | |
|---|---|---|---|
| 3,164,782 | 1/1965 | Ordway, Jr. | 331/94.5 P |
| 3,821,660 | 6/1974 | Shang et al. | 331/94.5 P |

OTHER PUBLICATIONS
Furumoto et al., Optical Pumps for Organic Dye Lasers, Applied Optics, Vol. 8, No. 8, (August 1969), pp. 1613–1623.

*Primary Examiner*—William L. Sikes
*Attorney, Agent, or Firm*—Wilford L. Wisner

[57] ABSTRACT

Laser solids, liquids and gases are pumped by a new technique in which the output from an efficient molecular laser, such as a $CO_2$ laser, ionizes a medium, such as xenon, into a generally cylindrical plasma volume, in proximity to the pumped laser body. Breakdown yields a visible and ultraviolet-radiation-emitting plasma in that volume to pump the laser body. The spectral radiance of the plasma is significantly higher than that produced by a d-c-discharge-heated plasma at nearly all wavelengths in the plasma spectrum. The risetime of radiation from the laser-produced plasma can also be significantly shorter than that of a d-c heated plasma. A further advantage resides in the fact that in some applications the attenuating walls needed by flashlamps may be eliminated with the result that laser threshold is more readily reached. Traveling wave excitation may be provided by oblique incidence of the pumping laser beam through the ionizable medium to create sequential ionization of portions of that medium along the length of the pumped laser body.

5 Claims, 12 Drawing Figures

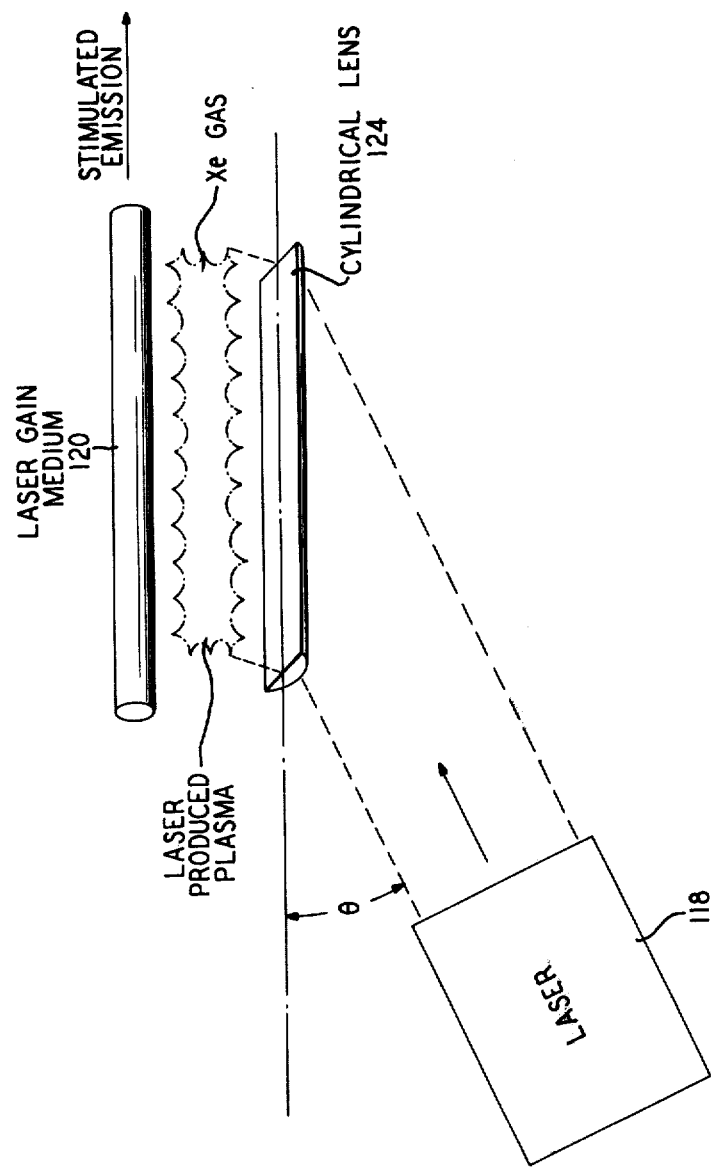

LASERS OPTICALLY PUMPED BY LASER-PRODUCED PLASMA

BACKGROUND OF THE INVENTION

This invention relates to techniques for optically pumping laser media.

Much effort has been exerted in the laser art to produce more efficient flashlamps. Any potential laser media, especially solids and liquids are most readily tested for laser action by optically pumping. The broad band pumping light from a flashlamp improves the prospects that the experimenter is able to excite the pumped medium via one or more optical absorptions of the medium. If a suitable optical absorption is sufficiently excited, then a population inversion can be obtained for generation of laser radiation.

Nevertheless, typical flashlamps have been a disappointment in many cases in trying to achieve laser action in new media or in testing new media for the possibility of laser action. In general, it has been very difficult to reach laser threshold with flashlamps. Even so, many new solid and liquid lasers have first been successfully reduced to practice by being pumped by another, typically higher frequency, laser. Such a pumping laser must be carefully selected in order to excite an appropriate absorption in the pumped medium. Many other potential lasers media have never been successfully optically pumped, either by a flashlamp or another laser.

Still, persistent efforts have been made to improve flashlamps, as shown by the article by H. W. Furumoto et al., *Applied Optics*, Vol. 8, page 1616 August 1969. We have recognized that still further improvement in optical pumping techniques is desirable.

SUMMARY OF THE INVENTION

Our invention is based on our discovery that the spectral radiance, that is the total light output, from a laser-produced plasma is two to three times greater in the ultraviolet region (200 nanometers to 300 nanometers) than is the spectral radiance from a xenon flashlamp of comparable size and input energy. While we do not wish to limit our discovery by any theoretical explanation, the observed results appear to be attributable to the different energy absorption mechanisms present in the ac-heated plasma (laser-produced plasma) and in the prior art dc-heated plasmas.

According to the principal feature of our invention, laser solids, liquids and gases are pumped by a generally cylindrical plasma in a medium such as xenon which is broken down by radiation from an efficient molecular laser, such as a $CO_2$ laser. Breakdown yields a visible and ultraviolet-radiation-emitting plasma in a generally cylindrical volume in proximity to the laser body to pump that body.

According to another feature of the invention, light confinement aids overall efficiency of our new pumping technique.

According to still another feature of our invention, in many applications the attenuating walls needed by flashlamps may be eliminated, so that laser threshold is more readily reached.

Advantages of reduced radiation risetime and higher peak powers at shorter wavelengths as compared to flashlamps are obtained by the embodiments of our invention.

BRIEF DESCRIPTION OF THE DRAWINGS

Further features and advantages of our invention will become apparent from the following detailed description, taken together with the drawings, in which:

FIG. 10 shows a modified embodiment of the invention for traveling wave excitation.

DESCRIPTION OF ILLUSTRATIVE EMBODIMENTS

Figure 1A:
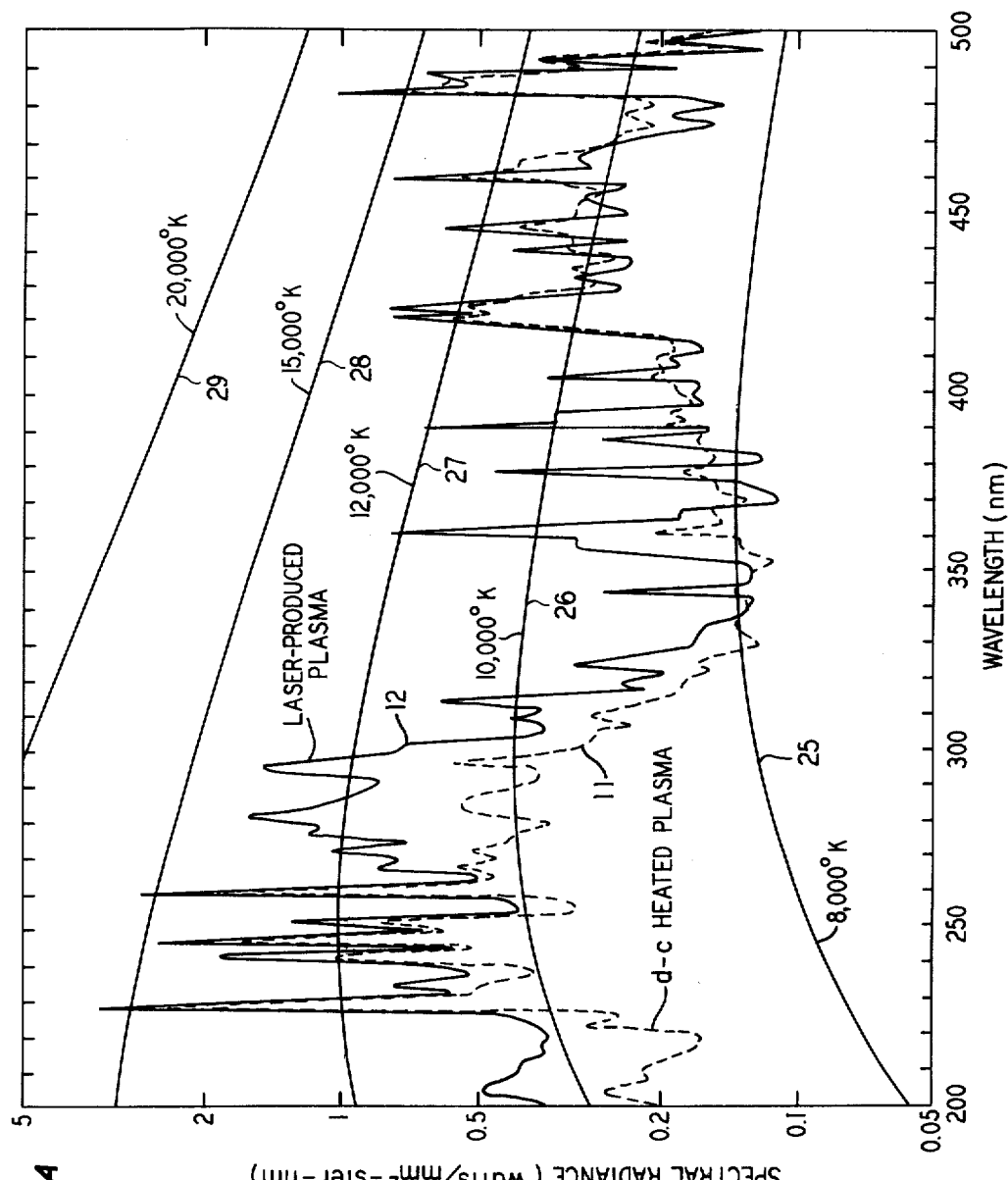
FIGS. 1A and 1B show spectral radiance curves comparing the laser-produced plasma with a dc-heated plasma.
Figure 1B:
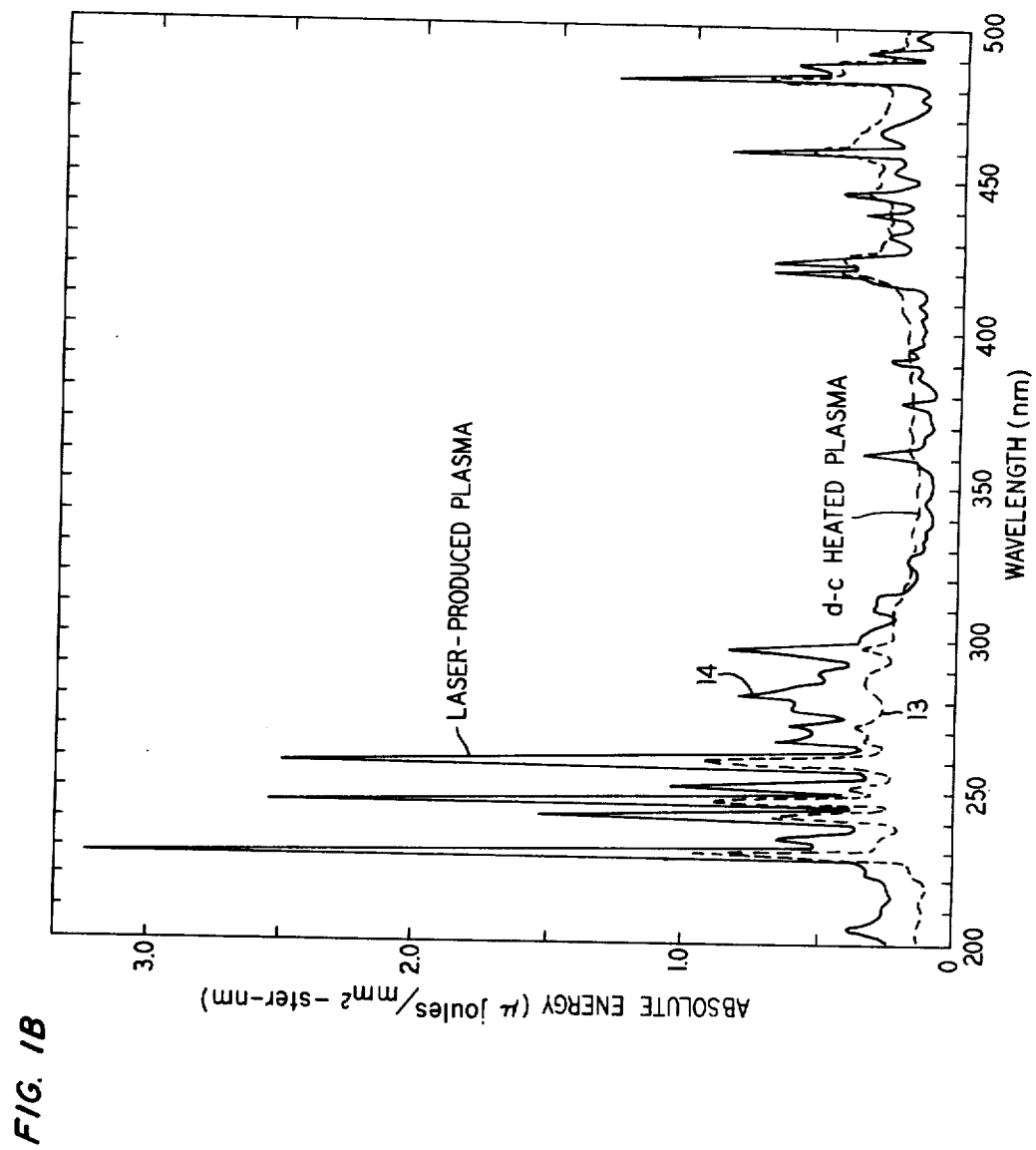

The curves of FIGS. 1A and 1B compare the spectral radiance for laser produced plasmas such as are used according to our invention and d-c-heated plasmas such as are ordinarily present in flashlamps. The comparison is made under comparable conditions with like presence or absence of attenuating walls between the plasma and the detector. In both FIGS. 1A and 1B the abscissa or horizontal axis is in nanometers a unit of wavelength (one namometer = $1 \times 10^{-9}$ meters).

In FIG. 1A the ordinate or vertical axis for spectral radiance is logarithmic in terms of watts per square millimeter-steradian-nanometer which is the power related and most typical measure of spectral radiance. The units of spectral radiance differ from those for radiation intensity or power because it is an attempt to define the total light output from the source as determined from a carefully calibrated detector and a carefully calibrated position.

The ordinate or vertical axis of FIG. 1B is linear in terms of absolute energy, that is, microJoules per square millimeter-steradian-nanometer which is a measure of total energy output, that is, pulse power times pulse length rather than being in terms of power, as in the ordinate values of FIG. 1A.

In FIG. 1A the solid curve 12 shows the results for the laser-produced plasma when the output from a 10.6 micrometer $CO_2$ laser breaks down a cylindrical xenon gaseous volume. The dotted curve 11 shows the results for a similar cylindrical plasma produced by a d-c discharge. Overlying curves 25 through 29 are black body radiation curves for constant absolute temperature range from 8000°K to 20,000°K.

In the ultraviolet region from 200 to 300 nanometers, the spectral radiance from the laser-produced plasma, e. g. curve 12, is two to three times greater than that produced by a xenon flashlamp of comparable size and input energy, as shown in curve 11. In addition, the rate of increase of ultraviolet emission with increasing input energy (not shown in the curves) is much greater for the laser-produced plasma than for the d c-heated plasma for input energies up to 0.8 Joules per centimeter, which was the maximum laser energy density used to produce the plasma.

As a specific example, a spectral radiance of two watts per $mm^2$-steradian-nanometer at 230 nanometers from an elongated xenon plasma can be produced by focused 10.6 micrometers laser radiation from a $CO_2$ molecular laser providing input energies per unit length to the cylindrical volume of the plasma of about 0.8 Joules per centimeter.

The differences of overall shape of curves 13 and 14 of FIG. 1B with respect to the shape of the analagous curves 11 and 12 respectively of FIG. 1A, aside from the accentuation of differences in height due to the linear scale, are due to the fact that the plasma pulses tend to become shorter at shorter wavelengths, for example, in the 250 to 300 nanometer range, than at the wavelengths longer than 300 nanometers. This fact may prove to be a positive advantage when using the laser-produced plasma in pumping some new laser media. The relative available radiant energy at the longer wavelengths may be deduced from the shape of curve 14 for the laser-produced plasma in the 300 to 700 nanometer wavelength range.

Figure 2A:
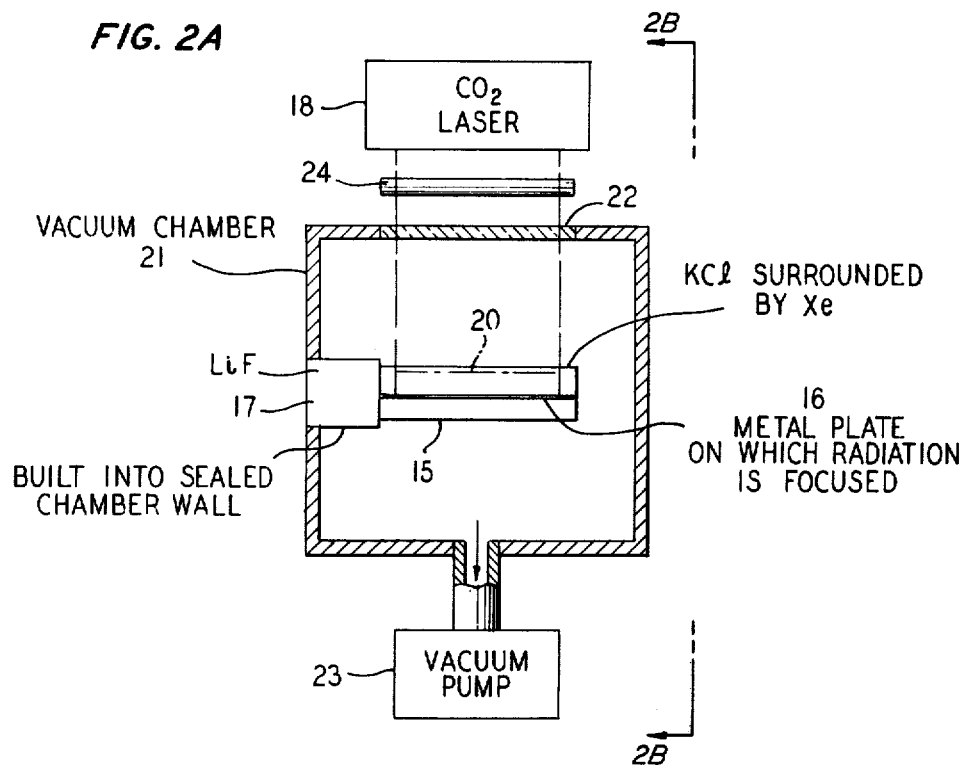
FIGS. 2A and 2B show respectively a pictorial perspective view and an end elevation of the simplest embodiment for pumping the new laser medium with the laser-produced plasma.
Figure 2B:
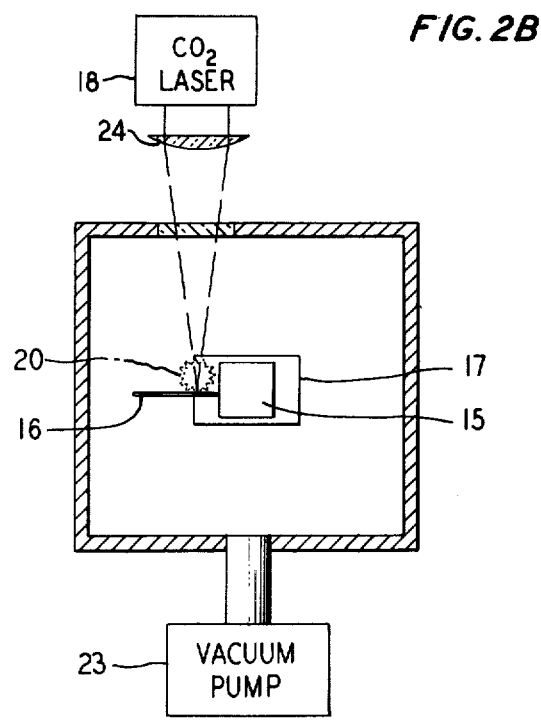

The laser-produced plasma was initiated by focused 10.6 micrometer radiation in the manner shown in FIGS. 2A and 2B. Illustratively, an arbitrary solid medium to be optically pumped such as potassium chloride (KCl) crystal 15 has attached thereto along one side an aluminum plate 16 and attached to one end thereof the crystal 17 selected to be highly transparent at the probable laser wavelength of the crystal 15. The assembly of crystal 15, plate 16 and crystal 17 is immersed in xenon gas from a compressed xenon gas source (not shown) in a vacuum chamber 21 which has a rock salt window 22 through which 10.6 micrometers radiation from $CO_2$ laser 18 is admitted. The vacuum chamber may have the xenon circulated therethrough by a vacuum pump 23 so that plasma products may be eliminated after each pulse.

While the embodiment of FIGS. 2A and 2B is shown in an arrangement for practical application to pumping a proposed laser crystal 15, it should be understood that, in our actual measurements for the purpose of comparison with d c-heated plasmas, crystal 15 and 17 were replaced by our spectrometer and the plate 16 was oriented so that the laser energy was incident thereon at an angle of 45° with respect to the normal to the plate. In addition, the spectrometer was positioned to observe the plasma radiation at an angle of 45° from the normal to plate 16 and thereby at an angle of 90° with respect to the incident laser radiation.

In contrast with most studies of optical breakdown, which use a spherical lens to form a localizes plasma, this investigation uses a 7.5 cm focal length cylindrical lens 24 (10mm × 0.4 mm focal region) to focus the laser beam onto a 1 mm wide aluminum target 16 enclosed in a cell 21 filled with xenon gas. An approximately cylindrically-shaped xenon plasma ~1 cm long and 3–4 mm diameter was formed directly in front of the target 16. The presence of a target reduced the breakdown threshold of the gas to a level such that significant plasma radiation was produced in the gas for laser intensities as low as $10^7$ $W/cm^2$. Aluminum was chosen as the target material for reasons of maximum reproducibility and minimum vaporization for the laser intensities used.

For higher input laser intensities or for different targets, target vaporization can advantageously be produced deliberately; and the vapor can yield the radiative plasma.

The 10.6 $\mu m$ laser pulse was provided by a one Joule double-discharge TEA $CO_2$ laser 18. The output from this laser consisted of a 50 nsec gain-switched spike containing one-third of the energy and a 500 nsec pulse tail containing two-thirds of the energy. The laser output energy was incident on the target at an angle of 45° with respect to the target normal. Measurements of the angular dependence of the spectral radiance showed that the measurements taken at 45° were similar to those taken at other angles and indicated the production of a relatively uniform plasma.

For the d-c heated plasma, an EG&G FX38 flashlamp (not shown) (length ~7.5 cm between electrodes and bore diameter ~4 mm) was chosen in order to provide approximately the same diameter plasma as that produced by the focused laser radiation. The flashlamp current was provided by a low inductance circuit that included a 0.02 $\mu F$ capacitor charged to voltages up to 30 KV and a triggered spark gap. A 2500 amp, 0.5 $\mu sec$ duration current pulse was obtained at 30 KV charging voltage (current density ~20,000 $amps/cm^2$).

The flashlamp output consisted of a 0.5 $\mu sec$ duration pulse, except at the longer wavelengths (>400 nm) for which this pulse was followed by one or more subsidiary pulses. Radiation from the laser-produced plasma occurred with a pulse duration 1.0 to 1.3 $\mu sec$, for wavelengths longer than 300 nm. And, in the region between 250 nm to 300 nm, the pulse duration was 0.5 $\mu sec$. In xenon, the risetime for radiation from the laser-produced plasma is as short as 30–40 nsec in the 250–300 nm spectral region.

Absolute intensities (averaged over the width of the plasma) were determined by first viewing a standard lamp through well-defined optics and a grating monochromator, and then replacing the standard by the plasmas, using a calibrated set of filters to determine intensity ratios. The standard lamp was a tungsten ribbon lamp calibrated against an NBS standard over the wavelength range from 250 to 500 nm.

In FIG. 1A, the spectral radiance as a function of wavelength produced by 0.8 Joule/cm input energy is shown for a laser-produced plasma in xenon at 50 Torr (near the optimum value for the laser-produced plasma) and for the flashlamp filled with xenon at 400 Torr. (This typical fill pressure for commercial lamps is a compromise between high output intensity and long lamp life). Between 200 nm and 250 nm, the absolute value of the spectral radiance is somewhat less certain since it was obtained by extrapolation from the calibrated value at 250 nm using the known response curves of the grating and detector. The wavelength region from 200 nm to 500 nm was measured at 2.5 nm intervals except at line peaks where an accuracy of 0.5 nm was obtained. Although the laser-produced plasma and the flashlamp provided similar intensities, in units of power, for wavelengths longer than 350 nm, the intensity, in units of power, of the laser-produced plasma was much higher in the 200 nm to 300 nm spectral region. FIG. 1, in curves 11 and 12, clearly illustrates that the radiation from the laser-produced plasma exhibits more pronounced line structure. All of these lines can be attributed to either singly or double ionized xenon.

Also shown in FIG. 1A are curves 25–29 for spectral radiance of a blackbody radiator calculated for a few representative temperatures labeled on the curves. Except for the pronounced dip near 350 nm and the prominent line structure over the entire spectral region, the flashlamp yields the same spectral radiance as would a 10,000°K blackbody. In contrast, in the region below 300 nm the spectral radiance from the laser-produced plasma is more nearly reproduced by a blackbody at 12,000°K.

In the flashlamp, the capacitor energy is mostly dissipated in ohmic heating, and only enough ionization occurs to sustain the discharge. The peak electron density was estimated (from voltage and current measurements) to be $10^{17}$ cm$^{-3}$ for an input energy of 0.8 Joules/cm. In the laser-produced plasma, the laser energy is absorbed by the inverse bremsstrahlung process, resulting in an electron density only limited by the critical density at which the plasma becomes highly reflecting ($2 \times 10^{19}$ cm$^{-3}$). Since significant energy at 10.6 $\mu$m is not absorbed by the inverse bremsstrahlung process until a plasma density of $\sim 10^{17}$ cm$^{-3}$ is reached, the electron density and, hence, the xenon ion density is possibly as much as an order of magnitude higher in the laser-produced plasma than in the d c heated plasma. This higher ion density is consistent with the dominance of emission lines from ionized xenon in the radiation from the laser-produced plasma.

Figure 3:
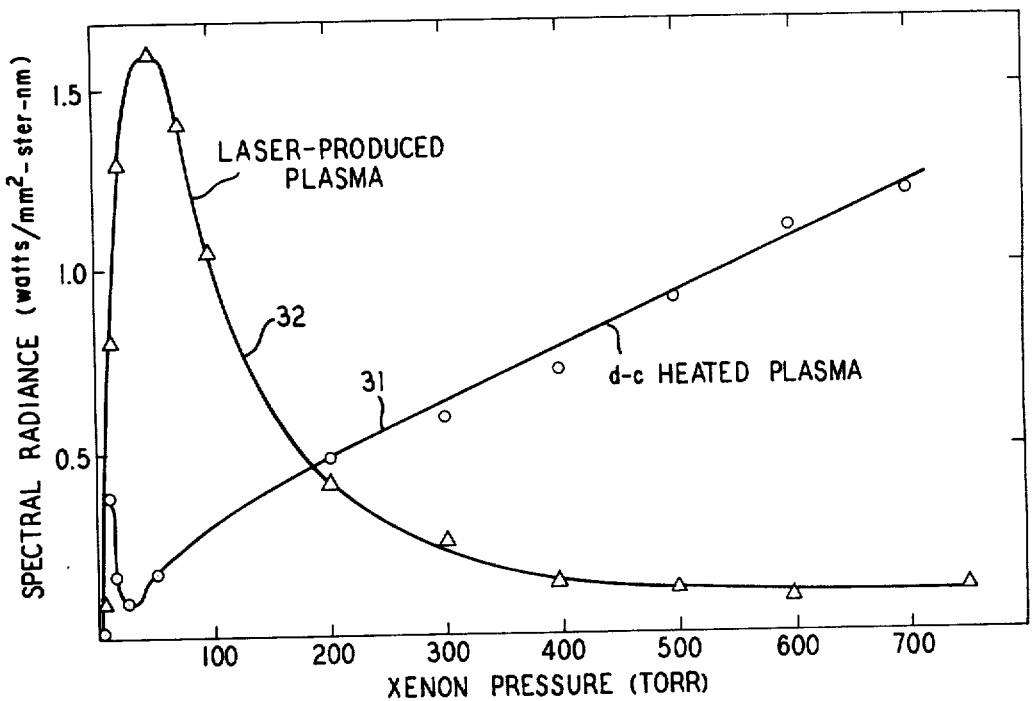
FIGS. 3 and 4 show curves that point out the differing spectral radiance characteristics of the different plasmas in terms of gas pressure and input energy.

The variation of spectral radiance at a constant input energy (0.8 Joules/cm) and at a fixed wavelength (282.5 nm) as a function of xenon pressure is shown in curves 31 and 32 in FIG. 3. Differences in the radiation characteristics of the laser-produced plasma (curve 32) and the d-c-heated plasma (curve 31) are clearly illustrated. If the spectral radiance from both kinds of plasmas is proportional to the rate of energy absorption (the loss mechanism for both plasmas should be similar for similar pressures), then the energy absorption for the laser-produced plasma is greatest at 50 Torr, whereas, in the d-c heated plasma, this rate maximizes at a much higher pressure. In the laser-produced plasma (at 10.6 $\mu$m), the input energy is expected to be predominantly absorbed by electrons during electron-ion collisions (at the electron densities under consideration) at a rate which is proportional to the electron-ion collision frequency, $\nu_{EI}$. In the d-c case, the energy is absorbed between these collisions at a rate which is proportional to $1/\nu_{EI}$. In general $\nu_{EI}$ is proportional to $n_e/T_e^{3/2}$ ($n_e$ is the electron density and $T_e$ is the electron temperature.) In the d-c heated arcs, $T_e$ is known to be relatively high at low pressures, decreases at some intermediate pressure (due to thermalization with ions) and then rises again at high pressures. If such a variation of $T_e$ with pressure holds for both plasmas, then it explains the observed maximum of $\nu_{EI}$ at 50 Torr in the xenon laser-produced plasma (where $T_e$ presumably is a minimum) and the corresponding minimum at a similar pressure for the d-c heated plasma (provided that $n_e$ does not exhibit a strong pressure dependence over the pressures studied). Experimental confirmation of this explanation will await measurements of the electron density and temperature of the plasma. We do not wish our invention to be limited to this explanation.

Figure 4:
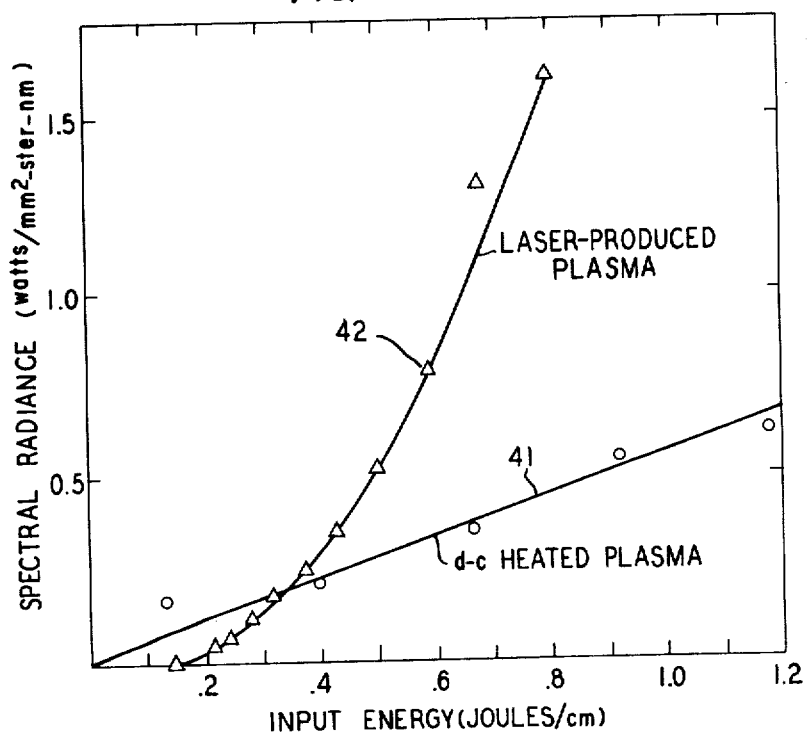

The variation of spectral radiance at a constant pressure and for a fixed wavelength (282.5 nm) as a function of the input energy is shown in curves 41 and 42 in FIG. 4.

The flashlamp output intensity increases linearly with increasing input energy up to the maximum input energy of 1.2 Joules/cm. This energy (9 Joules into the flashlamp in a 0.5 $\mu$sec duration pulse) approaches the manufacturer's maximum recommended power input to the lamp. The intensity from the laser-produced plasma in xenon gas at 50 Torr increases nonlinearly with increasing input energy over most of the range of energy available. The output from the laser-produced plasma equals that of the electrical flashlamp at 0.35 Joules/cm input and is nearly a factor of four greater than the flashlamp at 0.8 Joules/cm input (corresponding to $8 \times 10^7$ W/cm$^2$.) While this behavior is characteristic of emission in the 200–300 nm region, the slope of the curve 42 describing the laser-produced plasma decreases for longer wavelengths (not shown) and becomes approximately equal to that (curve 41) describing the d-c heated plasma in the 450–500 nm region. This comparison indicates the stronger heating effect of the laser at higher laser intensities and results in much higher peak-power emission than the d-c heated plasma at shorter wavelengths. A similar increase in radiation from a laser-produced plasma with input energy has previously been observed at a wavelength of 120 nm using a 1.06 $\mu$m neodymium laser focused onto a tantalum target. The results in FIG. 4 strongly suggest that the use of higher laser input intensities will produce much higher peak power radiation in the UV and vacuum UV.

The foregoing data shows that the spectral radiance of a cylindrically-shaped laser-produced plasma is greater in the ultraviolet than a geometrically similar d-c heated plasma for equivalent input energies/length. Such a cylindrically-shaped plasma, as a source is readily adapted to optical pumping of a crystal such as KCl crystal 15 in FIG. 2A and 2B, since an extended source is more easily matched to an elongated region (for gain enhancement) than a point source.

The specific arrangement shown in FIGS. 2A and 2B also eliminates the radiation absorbing envelope that surrounds typical flashlamps, produces much shorter risetimes, and therefore could more easily pump short-lived, high energy excited states in gases, liquids and solids.

Furthermore, the recent development of large aperture TEA lasers in efficient gaseous molecular laser media should make possible the generations of cylindrical plasmas having much larger dimensions, higher intensities and possibly much shorter risetimes than those produced in this study. Such extensions would make optical pumping of lasers with radiation from these plasmas not only possible but also relatively efficient.

Figure 5:
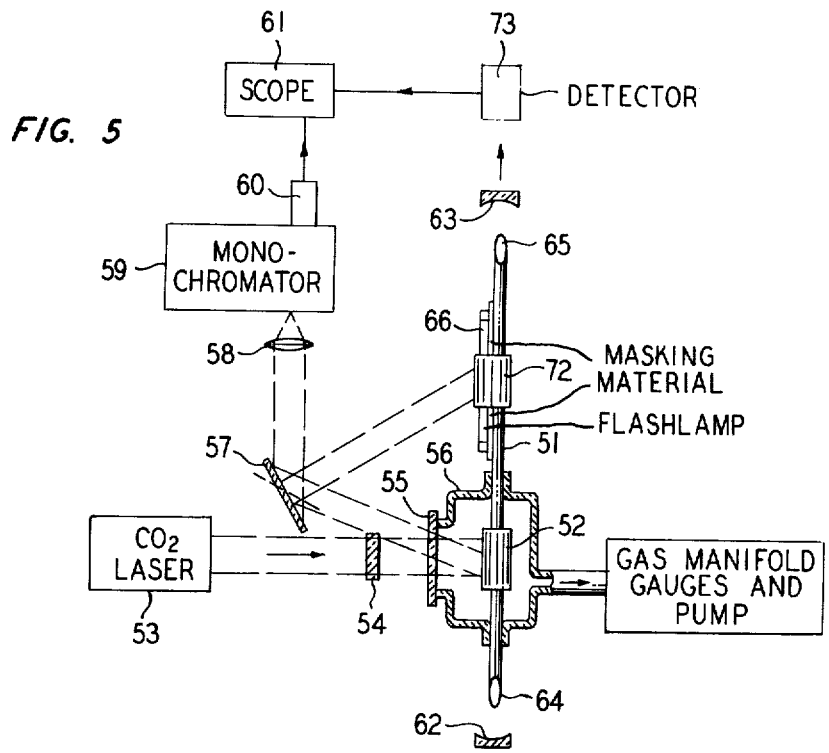
FIGS. 5 and 6 show a partially pictorial and partially block diagrammatic illustration of a more complex embodiment of the invention for pumping a photodissociation laser in iodine.
Figure 6:
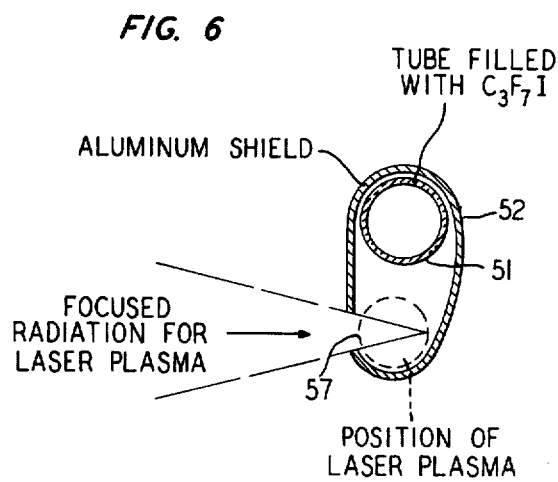

The feasibility and the practical utilization of our invention in pumping lasers has been actually demonstrated with the specific arrangement of FIGS. 5 and 6.

In FIGS. 5 and 6 an iodine photodissociation laser is optically pumped by ultraviolet radiation from a laser-produced plasma in xenon gas initiated by a 10.6 micrometer transverse excitation atmospheric pressure (TEA) CO$_2$ laser 53. The power output of the iodine laser at 1.315 micrometers, which oscillated well above threshold when pumped in this manner, was found to be a factor of 5 greater than the power output resulting from linear flashlamp pumping.

In FIG. 5 either CF$_3$I or C$_3$F$_7$I is contained in a quartz tube 51 inside of an aluminum collecting shield 52 as best seen in cross section in FIG. 6. The 10.6 micrometer laser beam from $CO_2$ laser 53 as above described was focused by a cylindrical lens 54 through the window 55 of a vacuum chamber 56 so that it just passes through the opening 57 of the aluminum collecting shield 52. Again, xenon gas is circulated within the vacuum chamber 56 so that a xenon plasma occurs inside aluminum shield 52 in a volume extending from just inside opening 57 to the proximity of the back wall of shield 52 facing opening 57. The long dimension of the cylindrical plasma volume is along the line of sight, orthogonal to the paper. The radiation from the plasma was detected by a detecting system including the mirror 57, lens 58 and monochrometer 59 including a phototube 60. The output of phototube 60 is displayed on scope 61.

The laser resonator for the 1.315 micrometer iodine laser is formed by laser mirror 62 and 63 at the opposite ends of tube 51 which has Brewster's-angle end windows 64 and 65.

The additional structural complication of the apparatus of FIG. 5 is attributable to the experimental apparatus needed to compare the output of the laser to that obtained with flashlamp pumping. In other words, the comparison is made to the laser output obtained when the optical pumping means is a flashlamp 66 and the laser active medium is enclosed partially in an aluminum collecting shield 72 identical to shield 52. Shield 72 also encloses tube 51, which is the same quartz tube filled with the same amount of $CF_3I$ or $C_3F_7I$ as was used within shield 52. The laser path lengths for both lasers are comparable. In other words, the illustrative structures enable the only variable to be the pumping source.

Notice that a major difference of the pump sources in FIG. 5 is that the laser-produced plasma is unimpeded by any tube walls, such as the flashlamp 66 has, so that the laser-produced plasma pumping technique according to our invention achieves the additional advantage attributable to lack of such walls and the elimination of the optical loss caused by them. In other words, as shown in FIG. 6 inside shield 52 there is only one tube, the tube 51, in which the pump medium is contained. In contrast, inside shield 72 there are two tubes 66 and 51 and, thereby, an additional attenuation for the d-c-heated plasma in tube 66. The laser radiation is detected by 1.315 micrometer detector 73 and may also be displayed on scope 61 to show its time relationship to the radiation from either pumping source within shield 52 or within shield 72. When source 66 is used mirror 57 is reoriented so that monochrometer 59 may monitor its radiation.

While prior workers have established photodissociation of $CF_3I$ or $C_3F_7I$ by ultraviolet light in the 2500 A. to 3,000 A. spectral region to produce a laser, none of these prior lasers employed the radiation from a laser-produced plasma.

In particular, in our experiment, an EG&G FX38C linear flashlamp 66 was mounted adjacent to the laser tube 51 as shown in FIG. 5 within collecting shield 72. The light output from both the laser-produced plasma and the flashlamp occurred within similar regions of their respective collecting shields. To provide a reasonable comparison with the laser-produced plasma, the flashlamp was masked-off to a 3 cm length.

The flashlamp was excited by a 0.02 $\mu F$ low-inductance capacitor (not shown) charged to voltages up to 30 kV. This allowed up to 9 joules of energy to be dissipated in the 7.5 cm long, 4 mm flashlamp or ~3.6 joules within the 3 cm optical pumping length of the unmasked region of the flashlamp. The peak current within the flashlamp was 2470 amperes with a pulse width of 0.8 $\mu sec$, resulting in a peak current density of 19,600 amperes/$cm^2$.

The 4 mm bore quartz laser tube 51 shown in FIG. 5 was 30 cm long and was enclosed with quartz Brewster's angle windows on each end. High reflectivity dielectric mirrors 62 and 63 were used to form a 45 cm optical cavity for the 1.315 $\mu m$ laser light. The laser produced plasma and the flashlamp were positioned symmetrically within the optical cavity 62, 63 to pump equivalent regions within the mode volume of the cavity.

Figure 8:
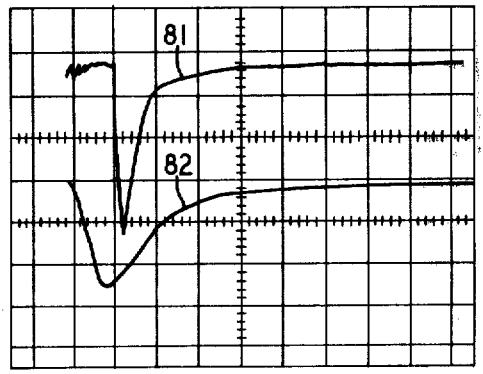

FIG. 8 shows oscilloscope traces of the iodine laser pulse 81 and the UV pumping pulse 82 produced by the laser produced plasma.

Figure 9:
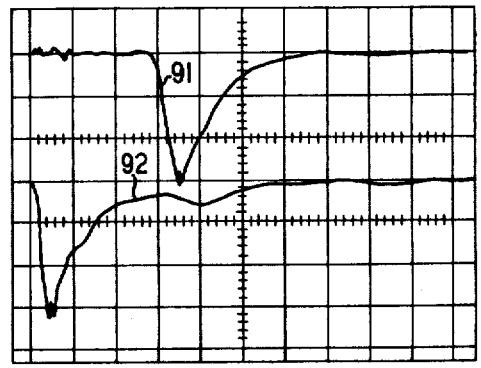

In FIG. 9, curves 91 and 92 show the like pulses for the flashlamp.

In FIG. 8, the lower trace 82 shows the light output from the laser produced plasma at 2700 A. produced by a 2.75 joule $CO_2$ laser pulse having a duration of ~50nsec (gain-switched spike) and 1 $\mu sec$ (pulse tail). The upper trace 81 shows the resulting iodine laser output.

In FIG. 9, the lower trace 92 shows the flashlamp output at 2700A. The upper trace 91 shows the weaker iodine laser output from the flashlamp 66. The intensity scale for this trace is five times smaller than the corresponding trace in FIG. 8. The intensity from the flashlamp cannot be directly compared to that of the laser-produced plasma in this experimental arrangement because of difficulties in obtaining equivalent light-collecting geometries.

Figure 7:
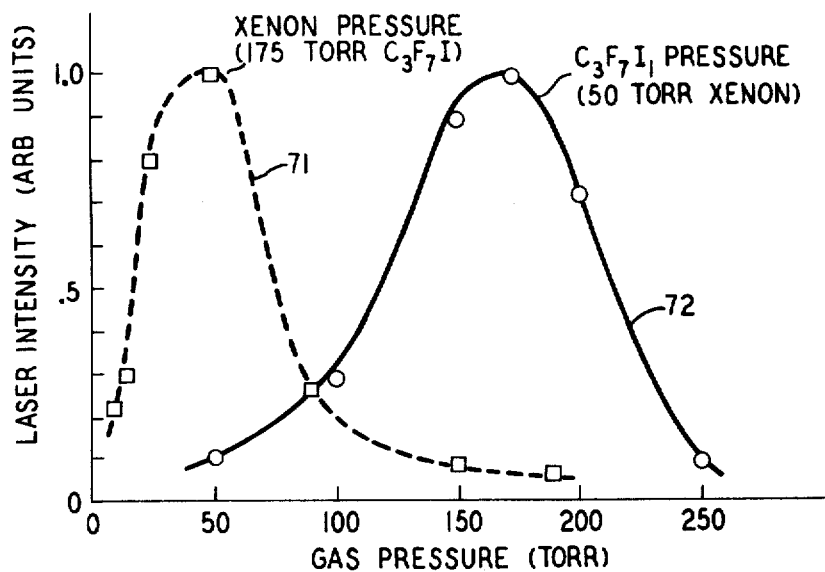
FIGS. 7, 8 and 9 show curves that are useful in explaining the operation of the embodiment of FIGS. 5 and 6.

FIG. 7 shows the variation of laser output with $C_3F_7I$ pressure in the laser tube with an optimum at 175 Torr (Curve 71). This optimum is consistent with previous measurements made by Hohla for a 4 mm bore, flashlamp-pumped $C_3F_7I$ iodine laser. The optimum is determined by the absorption length for the UV light within the active mode volume of the laser tube. Curve 72 of FIG. 7 also shows, for the laser-produced plasma the variation of laser output with xenon pressure with an optimum at 50 Torr. This is consistent with the fact that the UV peak power output from the plasma in the 2500A. – 3000A. spectral region (corresponding to the absorption band of $C_3F_7I$) is a maximum at this pressure, as explained above.

It may also be advantageous to produce the radiative plasma by directly focusing the radiation of the pumping laser on the body to be pumped through the material to be ionized, rather than focusing it on an adjacent target. The risetime of plasma radiation nearest the region of initial ionization is shortest and is needed to pump lasers with very short upper state lifetimes.

If a potential laser medium possesses a very high gain or a very short lifetime or has a population inversion between two energy levels that would correspond to a very short wavelength, than traveling-wave excitation would be highly advantageous. The advantage will particularly be strong if the build up of radiation from the laser produced plasma otherwise occurs along the path of travel of the laser light to be stimulated in a time short compared to the travel time of the light to be stimulated, that is, in a time short compared to the ratio of the length of the laser medium divided by the velocity of light therein.

Traveling-wave excitation would inhibit uncontrolled stimulated emission of radiation in directions other than the one desired, it would permit extraction of useful energy from laser systems with the very short lifetimes, and it would make the presence of the stimulated emission of radiation more apparent in very short wavelengths where suitable laser resonators do not now exist.

As show in FIG. 10, a laser-produced plasma pumping source can easily provide traveling-wave optical excitation of a laser gain medium 120. This objective is achieved in marked contrast to a flashlamp which is not as readily adapted to such a purpose. In FIG. 10 it is merely necessary to orient the direction of the beam of the ionizing input laser 118, illustratively a 10.6 micrometer carbon dioxide molecular laser, so that its beam propagates at an angle $\theta$ less than 90° with respect to the axis of the laser gain medium 120. Source 118 is adapted to provide its beam with a substantial width illuminating the entire length of a cylindrical lens 124 parallel to laser gain medium 120. Lens 124 focuses the light passing through it to a focus along a line parallel to the axis of medium 120 and ionizes the xenon gas in a cylindrical volume that parallels medium 120. The laser light arrives first at the left-hand end of the intended plasma region because of the shorter travel distance of the light propagating along that edge of the beam from laser 118. The laser light at the opposite edge of the beam from laser 118 arrives last at the focus line at which the plasma is to be produced, namely, at the right-hand end. Through adjustment of the angle of incidence $\theta$ of the pumping laser radiation, a laser-produced plasma will be initiated first at the left and at a later time at the right. Radiation from such a plasma would provide a traveling-wave optical pumping source with a phase velocity adjustable by changing the angle $\theta$. When the angle $\theta$ is 90°, the phase velocity in question is substantially infinity; and when the angle $\theta$ is close to zero degrees the phase velocity of the ionization of the xenon plasma is very close to the velocity of light and propagates uniformly in the direction from left to right along the pumped medium.

We claim:

1. Apparatus for the stimulated emission of coherent radiation, comprising a first body of material having a pair of optically connected energy levels between which a population inversion can be established, and means for optically pumping said body to establish said population inversion including means for supplying a quantity of a second material about said body, and laser means for creating a plasma in said quantity of said second material in a generally cylindrical volume substantially paralleling the surface of said body to generate visible and ultraviolet radiation from said volume, said plasma being optically closely-coupled with said body.

2. Apparatus according to claim 1 in which the optical pumping means includes a target having a surface adjacent to the first body of material, the laser means for breaking down a quantity of the second material including a source of a coherent infrared beam and means for cylindrically focusing said beam on said target surfaces essentially parallel the surface of the first body.

3. Apparatus according to claim 2 in which the target surface partially enfolds the first body of material and the quantity of a second material adjacent to the body to achieve confinement of the radiation from the plasma.

4. Apparatus according to claim 2 including a vacuum chamber containing the first body and second material and the target surface, a vacuum pump for evacuating plasma products from said vacuum chamber, and dielectric means optically coupling the first body to the exterior of the vacuum chamber.

5. Apparatus according to claim 1 in which the laser means for creating a plasma in the quantity of the second material comprises a laser oriented to direct a beam of elongated cross-section obliquely in the plane of elongation toward the axis of the body of the first material and cylindrical means for focusing said beam to ionize said second material adjacent the body of the first material sequentially in adjacent regions in a direction paralleling said axis, the angle of obliqueness producing differing travel times of the light to a focus paralleling said axis, whereby a traveling wave of radiation is provided by the plasma in the second medium.

* * * * *